US012527713B2

(12) United States Patent
Gao

(10) Patent No.: US 12,527,713 B2
(45) Date of Patent: Jan. 20, 2026

(54) MASSAGE ROLLER

(71) Applicant: Yiming Gao, Guangdong (CN)

(72) Inventor: Yiming Gao, Guangdong (CN)

(*) Notice: Subject to any disclaimer, the term of this patent is extended or adjusted under 35 U.S.C. 154(b) by 0 days.

(21) Appl. No.: 18/597,940

(22) Filed: Mar. 7, 2024

(65) Prior Publication Data

US 2024/0299236 A1 Sep. 12, 2024

(30) Foreign Application Priority Data

Mar. 7, 2023 (CN) ......................... 202320496758.3

(51) Int. Cl.
*A61H 15/00* (2006.01)

(52) U.S. Cl.
CPC ..... *A61H 15/00* (2013.01); *A61H 2015/0014* (2013.01); *A61H 2205/081* (2013.01)

(58) Field of Classification Search
CPC ................ A61H 15/00; A61H 15/0092; A61H 2015/0014; A61H 2201/169; A61H 2201/1695; A61H 2205/081
USPC ........................................................ D24/211
See application file for complete search history.

(56) References Cited

U.S. PATENT DOCUMENTS

| | | | | |
|---|---|---|---|---|
| 5,071,886 | A * | 12/1991 | Aoshima .................... | C08J 9/10 525/227 |
| 6,419,650 | B1 * | 7/2002 | Ryan ...................... | A61H 39/04 601/19 |
| 9,174,082 | B1 * | 11/2015 | Marlow ............. | A63B 23/1209 |
| 9,597,254 | B1 * | 3/2017 | Bhatt ..................... | A61H 7/007 |
| 9,656,112 | B2 | 5/2017 | Dye | |
| 10,265,238 | B2 | 4/2019 | Dye | |
| 10,278,890 | B2 | 5/2019 | Dye | |
| 10,695,258 | B1 * | 6/2020 | Johnson ................... | A61H 1/00 |
| 10,695,260 | B2 | 6/2020 | Dye | |
| D895,824 | S * | 9/2020 | Nelson ......................... | D24/211 |
| 11,160,719 | B2 | 11/2021 | Ploss et al. | |
| 11,576,837 | B2 | 2/2023 | Delgado | |
| D983,390 | S * | 4/2023 | Wang ........................... | D21/691 |
| 2010/0145240 | A1 * | 6/2010 | Cromie .................. | A63B 21/02 601/134 |

(Continued)

FOREIGN PATENT DOCUMENTS

CN 218076151 U * 12/2022

OTHER PUBLICATIONS

"YES4ALL 500 Lbs. Massage Trigger Points Spinal Wheel" https://www.amazon.com/YES4ALL-Massage-Trigger-Stretching-Improving/dp/BOBR3JV8QP/, Date First Available Dec. 26, 2022, accessed Apr. 26, 2024 (Year: 2022).*

(Continued)

*Primary Examiner* — Colin W Stuart
*Assistant Examiner* — Douglas Y Sul
(74) *Attorney, Agent, or Firm* — Che-Yang Chen

(57) ABSTRACT

A massage roller includes an outer massage wheel and an inner support, wherein the outer massage wheel is sleeved on the inner support and has a spine groove for protecting a spine of a user, the outer massage wheel has an inner circumferential engaging surface, the inner support has an outer circumferential mating surface, wherein the inner circumferential engaging surface is attached and engaged with the outer circumferential mating surface of the inner support without a glue applied between the outer massage wheel and the inner support.

3 Claims, 13 Drawing Sheets

(56) References Cited

U.S. PATENT DOCUMENTS

| | | | | |
|---|---|---|---|---|
| 2013/0184620 | A1* | 7/2013 | Cohen | A61H 15/02 601/118 |
| 2014/0012168 | A1* | 1/2014 | Carlson | A61H 15/0092 601/134 |
| 2016/0228323 | A1* | 8/2016 | Cheng | A61H 15/0092 |
| 2017/0065482 | A1* | 3/2017 | Downare | A61H 15/00 |
| 2017/0173830 | A1* | 6/2017 | Lewis | B29C 45/006 |
| 2017/0239133 | A1 | 8/2017 | Dye | |
| 2017/0246077 | A1 | 8/2017 | Dye | |
| 2019/0216679 | A1 | 7/2019 | Dye | |
| 2019/0231635 | A1 | 8/2019 | Dye | |
| 2020/0113774 | A1 | 4/2020 | Dye | |
| 2020/0129371 | A1 | 4/2020 | Dye | |
| 2021/0045965 | A1 | 2/2021 | Dye | |
| 2021/0113423 | A1* | 4/2021 | Kim | A61H 15/00 |

OTHER PUBLICATIONS

"Chirp Wheel Foam Roller—Targeted Muscle Roller for Deep Tissue Massage, Back Stretcher with Foam Padding, Supports Back Pain Relief", https://www.amazon.com/dp/B09M5XC923/?th=1, Date First Available, Nov. 17, 2021, accessed Apr. 26, 2024 (Year: 2021).*

"Fitbeast Back Roller—Unboxing & Review", https://www.youtube.com/watch?v=68CculBf1S0&, posted by BarRookie, Aug. 22, 2022, retrieved Dec. 6, 2024 (Year: 2022).*

"Eliminate Neck and Back Pain—Increase Spinal Mobility With FITBEAST Back Roller", https://www.youtube.com/watch?v=zaGhhxhTzO4 posted by OcraMed Health, Aug. 4, 2022, retrieved May 14, 2025 (Year: 2022).*

* cited by examiner

MASSAGE ROLLER

CROSS REFERENCE OF RELATED APPLICATION

This application is a non-provisional application that claims priority under 35U.S.C. § 119 to China application number CN202320496758.3, filing date 03/07/2023, wherein the entire content of which is expressly incorporated herein by reference.

BACKGROUND OF THE PRESENT INVENTION

Field of Invention

The present invention relates to the field of muscle massage, and more particularly to a massage roller which is adapted for stretching the spine and massaging muscles of the back of the user while having a spine groove for protecting the spine of the user.

Description of Related Arts

Currently, the rollers on the market for back muscle massage and relaxation of human beings include yoga wheels and foam rollers. The foam roller is long in length and thin in diameter, and can only achieve rough rolling massage on a relatively large area of the superficial back muscles, resulting in problems such as lack of concentration, lack of precision, and poor massage effect and efficiency. The yoga wheel has a narrow width, and the pressure during rolling is concentrated on both sides of the spine. However, because of its internationally standardized diameter size, smooth surface, and design of lack of a groove for spinal protection, using this type of yoga wheel for rolling massage can lead to problems such as lack of choice in back stretching degree and massage pressure, and may also result in injury to the spine of the human back.

There are also some conventional massage rollers specifically designed for human back on the market, but they are simply based on the yoga wheel with the addition of a spinal groove or the addition of massage protrusions on the yoga wheel, and they also suffer from poor back roller massage effect and efficiency.

SUMMARY OF THE PRESENT INVENTION

In view of this, the present invention provides a back massage structure with a spine groove and a massage roller to solve the problem of poor effect and efficiency of current back roller massage.

On the first aspect, the present invention provides a back massage structure with a spine groove, the back massage structure comprises a sheet-like structure with an engaging surface and a massage surface opposite to the engaging surface; the sheet-like structure forms a massage surface with a plane and multiple elastic protrusions; the elastic protrusions are multiple, and the multiple elastic protrusions are formed into at least two rows that are basically arranged in a straight line along the length direction of the massage surface, and the spacing formed by the at least two rows of elastic protrusions constitutes a spine groove for accommodating the spine during back massage, and the spacing is defined as the distance between the edge of any two different columns of elastic protrusions that are combined with the plane in the width direction of the massage surface, and the distance of the spacing is 15-35 mm.

Preferably, the sheet-like structure is made of one of the following materials: foam material, silicone, elastic thermoplastic material or PVC material.

Preferably, the height of the elastic protrusion is 8-25 mm, and/or, multiple elastic protrusions in any column are connected as one column.

Preferably, multiple elastic protrusions in any column are not connected to each other, but are connected as one column through the plane of the massage surface.

Preferably, the massage surface is divided into at least two massage areas in the length direction, and the massage depth of the at least two massage areas is different.

Preferably, the difference in massage depth is determined by the different shapes of the elastic protrusions or the different materials of the elastic protrusions in the massage areas.

According to a second aspect, the present invention provides a massage roller, comprising or applying the back massage structure with spine groove mentioned above, and the massage roller also comprises an inner wheel, and the outer annular surface of the inner wheel is circumferentially engaged with the mating surface of the back massage structure.

Preferably, the two side edges of the outer annular surface form steps in the direction of combination with the mating surface, and the steps form an accommodating space on the inner wheel for accommodating the back massage structure.

Preferably, the height of the steps relative to the outer annular surface is lower than the thickness of the back massage structure.

Preferably, the hardness of the inner wheel is sufficient to support the rolling of the massage roller; and/or the diameter range of the outer annular surface of the inner wheel is 62-330 mm, and the length of the back massage structure in the length direction is consistent with the circumference of the outer annular surface of the inner wheel.

Compared with the prior art, the present invention has at least the following beneficial effects:

1. The back massage structure with the spine groove in the embodiments of the present invention is provided with elastic protrusions, which can massage the deep muscles of the back more deeply, thereby improving muscle vitality, eliminating muscle nodules, promoting blood circulation, and relieving back tension and soreness; wherein the arrangement of multiple elastic protrusions can be intermittent or continuous, intermittent arrangement can make the back feel strong concave-convex sensation, massage more deeply, continuous arrangement can roll the back smoothly and have higher comfort; the height of the protrusions is preferably 8-25 mm, too small will have no massage pressure, and too large will have excessive pressure.

2. In the embodiments of the present invention, there is a spacing between at least two rows of elastic protrusions, and a naturally formed recessed spine protection groove is formed due to the height of the elastic protrusions, which can protect the spine from damage during use.

3. In the embodiments of the present invention, different massage intensities of different softness and hardness are achieved by setting two different massage areas, for example, distinguishing between a soft massage area and a hard massage area. The soft massage area and the hard massage area are mainly determined by the softness and/or hardness of the material and/or the shape of the protrusions. The material of the hard massage area is harder, and the contact area between the protrusions and the back is smaller, so the massage pressure is greater. The material of the soft massage area is softer, and the contact area between the protrusions and the back is larger, so the massage pressure is smaller.

4. The inner wheel of the massage roller in the embodiments of the present invention can have different sizes, and different sizes have different stretching forces and pressures on the back. The larger the size, the stronger the stretching force and the smaller the pressure, and the smaller the size, the weaker the stretching force and the greater the pressure.

5. The edge of the massage roller in the embodiments of the present invention also has a step design to achieve an anti-scratch effect. It can prevent edge scratches and can tightly enclose and retain the outer wheel in the accommodating space of the inner wheel.

Another advantage of the present invention is to provide a massage roller, wherein an outer massage wheel comprise an inner circumferential engaging surface which is fitting to an outer circumferential mating surface of an inner wheel, wherein both of the inner circumferential engaging surface of the outer massage wheel and the outer circumferential mating surface of the inner wheel are smooth circumferential surfaces which are seamlessly attached to each other, and no glue is required to be applied between the inner circumferential engaging surface of the outer massage wheel and the outer circumferential mating surface of the inner wheel, so that the assembling is environment-friendly, and the uniformity of the outer massage wheel is ensured.

Another advantage of the present invention is to provide a massage roller, wherein a foaming material is foamed to form the outer massage wheel which is sleeved and wound around the inner wheel, so as to facilitate the assembling process.

Another advantage of the present invention is to provide a massage roller, wherein an inner diameter of the inner circumferential engaging surface of the outer massage wheel is slightly smaller than an outer diameter of the outer circumferential mating surface of the inner wheel, so that the outer massage wheel is not easy to slip off from the inner wheel, and thus the outer massage wheel is firmly retained on the inner wheel.

Another advantage of the present invention is to provide a massage roller, wherein the outer massage wheel has a spine groove which is able to protect the spine of the user, so that it will not cause pain to the spine during the massage exercise.

Another advantage of the present invention is to provide a massage roller, wherein the spine groove has a width and a depth that are suitable for different users.

Another advantage of the present invention is to provide a massage roller, wherein massage positions adjacent to the spine groove have a larger massage depth than other areas of the massage surface of the outer massage wheel, so as to enhance the spine stretching effect and enhance the massage effect to the erector spinae muscles.

Another advantage of the present invention is to provide a massage roller which has a configuration adapted for massaging the psoas major muscles and the erector spinae muscles.

Another advantage of the present invention is to provide a massage roller, wherein the two sides of the spine groove are respectively formed with guiding surfaces, so that the spine of user is easy to be guided into the spine groove for being protected in the spine groove.

Another advantage of the present invention is to provide a massage roller which can provide different massage effects to the user by configuring resilient protrusions of different materials, different shapes or different areas.

Additional advantages and features of the invention will become apparent from the description which follows, and may be realized by means of the instrumentalities and combinations particularly pointing out in the appended claims.

According to the present invention, the foregoing and other objects and advantages are attained by a massage roller comprising an outer massage wheel and an inner support, wherein the outer massage wheel is sleeved on the inner support and has a spine groove for protecting a spine of a user.

According to an embodiment, the outer massage wheel comprises an inner circumferential engaging surface, the inner support comprises an outer circumferential mating surface, wherein the inner circumferential engaging surface is attached and engaged with the outer circumferential mating surface of the inner support without a glue applied between the inner circumferential engaging surface of the outer massage wheel and the outer circumferential mating surface of the inner support.

According to an embodiment, both of the inner circumferential engaging surface of the outer massage wheel and the outer circumferential mating surface of the inner support are smooth surfaces.

According to an embodiment, the inner circumferential engaging surface of the outer massage wheel has an inner diameter which is smaller than an outer diameter of the outer circumferential mating surface of the inner support.

According to an embodiment, the outer massage wheel is formed from a foamed wheel which has an inner diameter that is larger than the inner diameter of the inner circumferential engaging surface of the outer massage wheel, wherein the foamed wheel is shrunk to reduce the inner diameter of the foamed wheel until the inner diameter of the foamed wheel is equal to the said inner diameter of the inner circumferential engaging surface of the outer massage wheel.

According to an embodiment, a width of the spine groove is ranged from 15 mm-35 mm, wherein a height of the spine groove is ranged from 8 mm-25 mm.

According to an embodiment, the outer massage wheel comprises a massage portion which comprises two circumferential massage regions, wherein the spine groove is defined between the two circumferential massage regions.

According to an embodiment, each of the circumferential massage regions is configured to provide a first massaging depth which is adjacent to the spine groove, and a second massaging depth which is away from the spine groove, wherein the first massaging depth is larger than the second massaging depth for achieving deep massage to the erector spinae muscles of the user while stretching the spine of the user.

According to an embodiment, each of the circumferential massage regions comprise a guiding surface, wherein the spine groove is defined between two the guiding surfaces, wherein a distance between the two guiding surfaces is reduced from top to bottom, so as to facilitating the guiding of the spine of the user to enter the spine groove.

According to an embodiment, each of the guiding surface is one of inclined surface, curved surface, arc-shaped surface and stepped surface.

According to an embodiment, each of the circumferential massage regions comprises a plurality of resilient protrusions, wherein two adjacent resilient protrusions are spaced apart from each other, wherein two inner rows of the plurality of resilient protrusions form the spine groove at a center of the outer massage wheel.

According to an embodiment, the plurality of resilient protrusions of each of the circumferential massage regions comprises a row of first resilient protrusions defining the spine groove and a plurality of second resilient protrusions at an outer side of the row of first resilient protrusions, wherein the row of first resilient protrusions is configured to provide a first massaging depth which is adjacent to the spine groove, and a second massaging depth is provided by the plurality of second resilient protrusions, wherein the first massaging depth is larger than the second massaging depth for achieving deep massage to the erector spinae muscles of the user while stretching the spine of the user.

According to an embodiment, the outer massage wheel comprises a base layer comprising an outer surface, wherein the plurality of resilient protrusions of each of the circumferential massage regions is integrally protruded from the outer surface of the base layer to form the massage portion on the base layer.

According to an embodiment, the inner support comprises an inner wheel, wherein the base layer comprises an inner circumferential engaging surface, the inner wheel comprises an outer circumferential mating surface, wherein the inner circumferential engaging surface is attached and engaged with the outer circumferential mating surface of the inner wheel without a glue applied between the inner circumferential engaging surface of the base layer of the outer massage wheel and the outer circumferential mating surface of the inner wheel, wherein an inner diameter of the base layer is smaller than an outer diameter of the inner wheel.

According to an embodiment, each of the circumferential massage regions comprises a circumferential protrusion, the spine groove at a center of the outer massage wheel is formed between two the circumferential protrusions.

According to an embodiment, the outer massage wheel comprises a base layer, wherein the massage portion is integrally formed on the base layer, wherein the spine groove is indented into the base layer.

According to an embodiment, each of the circumferential massage regions further comprises a plurality of resilient protruding areas which are distinguishable from each other, wherein the plurality of resilient protruding areas is provided an outer side of the corresponding circumferential protrusion, wherein each circumferential protrusion is configured to provide a first massaging depth which is adjacent to the spine groove, and a second massaging depth is provided by the plurality of resilient protruding areas, wherein the first massaging depth is larger than the second massaging depth for achieving deep massage to the erector spinae muscles of the user while stretching the spine of the user.

According to an embodiment, each of the circumferential massage regions has a concave groove formed an outer side of the corresponding circumferential protrusion, wherein the resilient protruding areas corresponding to the concave groove is arranged for massaging psoas major muscles of the user.

According to an embodiment, the circumferential protrusion comprises a guiding surface, wherein the spine groove is defined between two the guiding surfaces, wherein a distance between the two guiding surfaces is reduced from top to bottom, so as to facilitating the guiding of the spine of the user to enter the spine groove.

According to an embodiment, the inner support comprises an inner wheel, wherein the base layer comprises an inner circumferential engaging surface, the inner wheel comprises an outer circumferential mating surface, wherein the inner circumferential engaging surface is attached and engaged with the outer circumferential mating surface of the inner wheel without a glue applied between the inner circumferential engaging surface of the base layer of the outer massage wheel and the outer circumferential mating surface of the inner wheel, wherein an inner diameter of the base layer is smaller than an outer diameter of the inner wheel.

According to an embodiment, the outer massage wheel comprises a base layer comprising an outer surface, wherein the plurality of resilient protrusions of each of the circumferential massage regions is integrally protruded from the base layer to form the massage portion on the base layer, wherein each of the resilient protrusion of the inner rows of the resilient protrusions comprise an inner edge which is joined with the outer surface of the base layer, wherein a distance between the inner edges of the two inner rows of the plurality of resilient protrusions is defined as a width W of the spine groove, wherein the width W of the spine groove is ranged from 15 mm-35 mm, wherein a height of the spine groove is ranged from 8 mm-25 mm.

According to an embodiment, a distance between the two circumferential protrusions define a width of the spine groove which is ranged from 15 mm-35 mm, wherein a height of the spine groove is ranged from 8 mm-25 mm.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Figure 1:
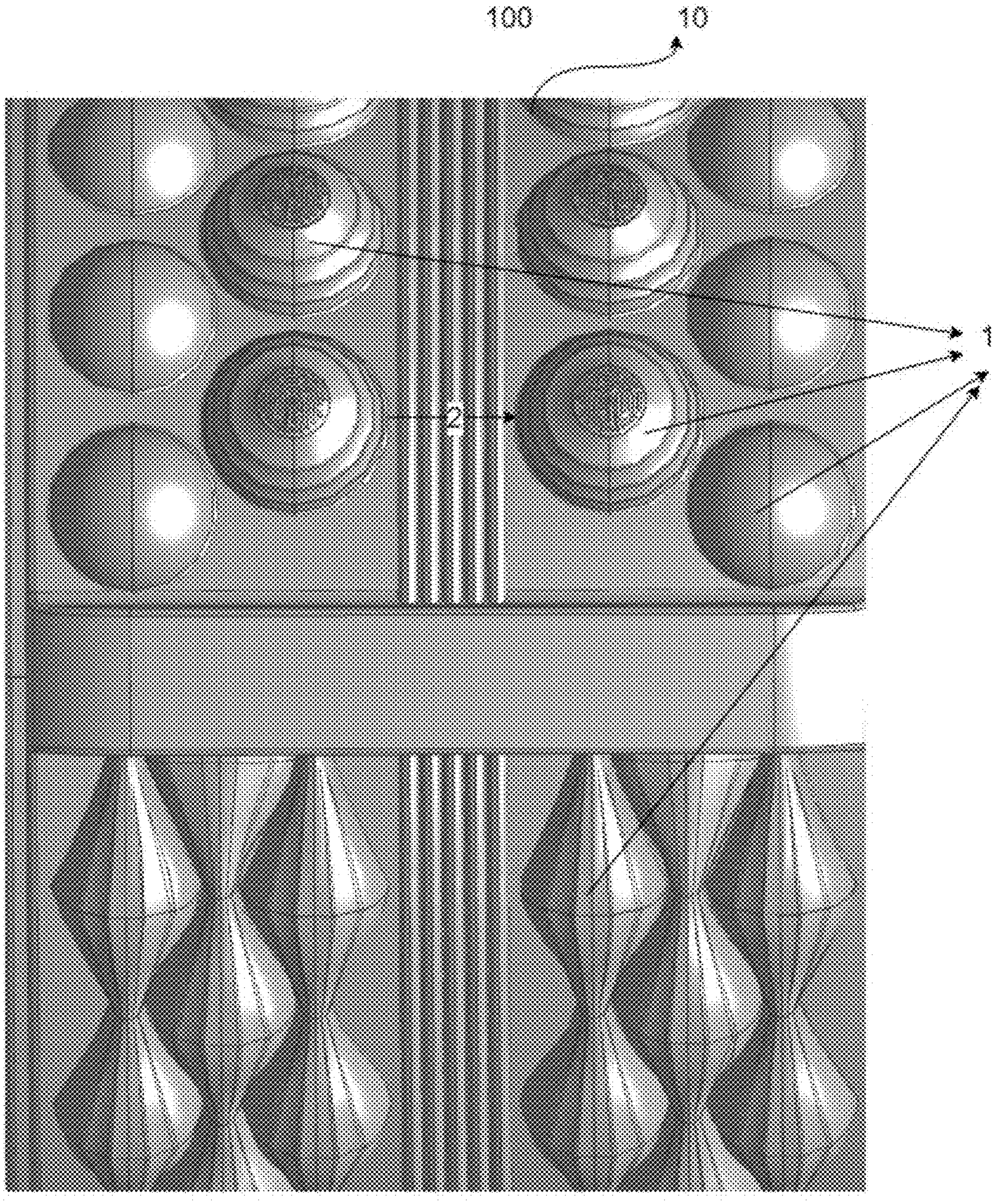
FIG. 1 is a schematic view illustrating a back massage structure with a spine groove according to a first preferred embodiment of the present invention.

Referring to FIG. 1, a back massage structure 100 with a spinal groove is provided, the back massage structure comprises a sheet structure with an engaging surface and a massage surface opposite to the engaging surface, the sheet structure forms a massage surface 10 with a plane and a plurality of elastic protrusions 1, the plurality of elastic protrusions 1 are arranged in at least two rows, which are basically linearly arranged along the length direction of the massage surface, and the spacing formed by the at least two rows of elastic protrusions 1 constitutes a spine groove 2 for accommodating the spine during back massage, the spacing is defined as the distance between the edges of two inner rows of elastic protrusions 1 in the width direction of the massage surface 10, and the distance of the spacing is 15-35 mm.

The back massage structure with the spine groove 2 in this embodiment is provided with elastic protrusions 1 which can massage the deep muscles of the human back more deeply, thereby improving muscle vitality, eliminating muscle nodules, promoting blood circulation, and achieving the purpose of relieving back tension and soreness.

The columns of at least two rows of elastic protrusions 1 in this embodiment are spaced apart, and a naturally formed concave spinal protection groove is formed due to the height of the elastic protrusions 1, so as to protect the spine from damage during use.

In this embodiment of the present invention, the sheet structure can be made of the following elastic materials: foam material, silicone material, elastic thermoplastic material, or PVC material, etc.

In this embodiment of the present invention, the height of the elastic protrusions 1 is preferably 8-25 mm. This range is a height range that can be accepted by ordinary people. If it is too small, there will be insufficient massage pressure, and if it is too large, the pressure will be too high.

In this embodiment of the present invention, the elastic protrusions 1 in any row are connected as an integral row. Among them, the arrangement of the plurality of elastic protrusions 1 in one row can be intermittent or continuous. The intermittent arrangement can make the concave-convex sensation felt by the human back be more intense, and the massage more thorough. The continuous arrangement can provide a smooth back pressure and higher comfort when rolling.

In an example of the present invention, the plurality of elastic protrusions 1 in any row are not connected to each other, but are connected as a row through the flat surface of the massage surface 10.

In an example of the present invention, the massage surface is divided into at least two massage areas in the length direction, and the depth of massage in the at least two massage areas is different. For example, two massage areas occupy approximately half of the massage surface each, thus obtaining two massage areas to meet different massage needs. It is also conceivable for those skilled in the art to set three or more massage areas to meet more types of massage needs.

In an example of the present invention, the different depth of massage is determined by the different shapes of elastic protrusions 1 or the different materials of elastic protrusions 1 in the massage area. For example, it can be understood that if the shape of the elastic protrusions 1 is relatively sharper or higher, the massage will be deeper; if the hardness of the material of the elastic protrusions 1 is higher, the depth of the massage will also be deeper.

Figure 2:
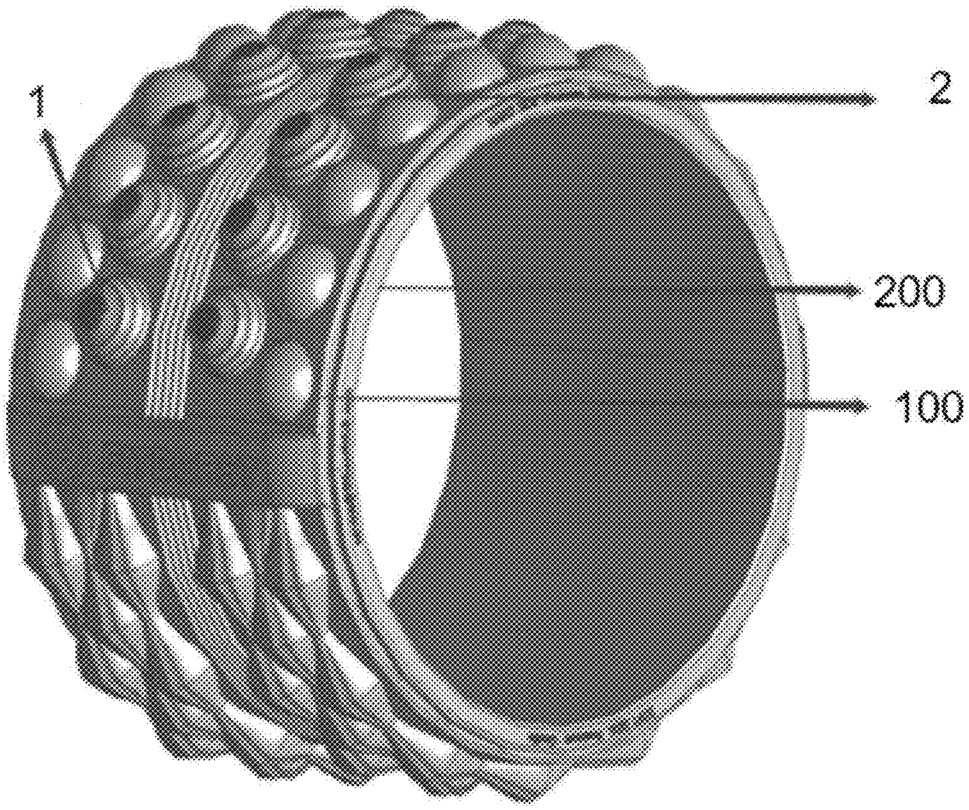
FIG. 2 is a perspective view of a massage wheel according to the first preferred embodiment of the present invention.

Referring to FIG. 2, a massage roller is illustrated to comprise the back massage structure 100 with the spine groove 2 in FIG. 2 and an inner wheel 200. The massage roller also comprises an inner wheel 200, and the outer wheel surface of the inner wheel 200 is circumferentially engaged with an inner mating surface of the back massage structure 100. The back massage structure 100 is a sheet-like structure that can be bonded to the inner wheel 2001 by a glue or adhesive, so as to form an ring structure that is attached on the outer wheel surface of the inner wheel 200.

Figure 3:
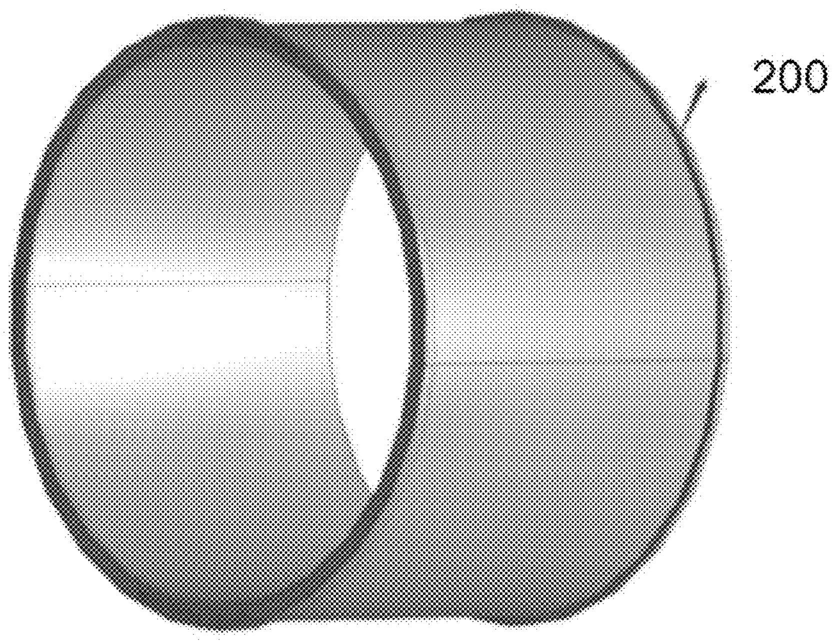
FIG. 3 is a perspective view of an inner wheel according to the first preferred embodiment of the present invention.

As shown in FIG. 3, the inner wheel 200 of the massage roller can have different sizes, and different sizes to exert different stretching forces and pressures on the back. The larger the size, the stronger the stretching force and the smaller the pressure, while the smaller the size, the weaker the stretching force and the greater the pressure.

In an example of the present invention, as shown in FIG. 3, the two side edges of the outer wheel surface form steps along the direction of combination with the engaging surface of the back massage structure 100, and the steps form an accommodating space on the inner wheel 200 to accommodate the back massage structure 100.

In an example of the present invention, the height of the step relative to the outer wheel surface is lower than the thickness of the back massage structure. Since the inner wheel is made of hard rubber material and has sharp edges, during the process of rolling on the back, the edges may cause pain or scratches to the user's back. This design can achieve the effect of preventing abrasion and scratches, and can also tightly enclose the outer massage wheel within the inner wheel 200.

In an example of the present invention, the hardness of the inner wheel 200 is sufficient to support the rolling of the massage roller. In general, the inner wheel 200 can have different sizes, as different sizes exert different stretching forces and pressures on the back. The larger the size, the stronger the stretching force and the smaller the pressure, while the smaller the size, the weaker the stretching force and the greater the pressure. The diameter range of the outer wheel surface of the inner wheel 200 is 62-330 mm, and the length of the back massage structure 100 in the length direction is consistent with the circumference of the outer wheel surface of the inner wheel 200.

Referring to FIG. 4 to FIG. 8 of the drawings, a massage roller according to a second preferred embodiment of the present invention is illustrated. In this embodiment, the massage roller comprises an outer massage wheel 30 and an inner support 40, the outer massage wheel 30 is wound around the inner support 40 for providing a massage effect to a user.

The inner support 40, which functions as a sturdy and rigid core that can withstand an impressive weight capacity, an be made of metal, plastic, ceramics, etc. As an example, the inner support 40 is a sturdy ABS (Acrylonitrile Butadiene Styrene) plastic core that is PVC-free, so that the inner support 40 can endure strong compression and is impact resistant. According to this embodiment, the inner support 40 can withstand an impressive weight capacity of up to 1000 pounds.

The outer massage wheel 30, which is arranged to have a contact with a human body portion of the user for massaging the human body portion of the user, is preferred to be made of an elastic material which can be foam material, silicon material, elastic thermoplastic material, or PVC (Polyvinyl chloride) material, etc. According to this preferred embodiment, the outer massage wheel 30 is made of EVA (Ethylene Vinyl Acetate) material.

More specifically, the outer massage wheel 30 comprises a base layer 31 for mounting with the inner support 40 and a massage layer 32 integrally formed on the base layer 31 for massaging the human body portion such as a human back or a leg of the user.

In this embodiment, the base layer 31 is formed in a ring shape and comprises an inner circumferential engaging surface 311 defining an inner circular receiving chamber 312 for receiving the inner support 40 and an outer surface 313 opposite to the inner circumferential engaging surface 311. In other words, the inner circumferential engaging surface 311 and the outer surface 313 are respectively provided at two opposite sides of the base layer 31. The massage layer 32 is integrally formed and protruded on the outer surface 313 of the base layer 31.

The inner support 40 comprises an inner wheel 41 for mounting the base layer 31 of the outer massage wheel 30, so as to retain the outer massage wheel 30 on the inner support 40. More specifically, the inner wheel 41 is a ring-shaped wheel that is fitted into the inner circular receiving chamber 312 of the base layer 31 of the outer massage wheel 30, so that the inner wheel 41 functions as an inner core of the massage roller.

Accordingly, the inner wheel 41 comprises an inner surface 411 defines an inner chamber 412, so that the material for the inner support 40 is reduced, and it is also convenient for the user to carry the massage roller by allowing an arm of the user to penetrate through the inner chamber 411 of the inner wheel 41.

According to this embodiment, the inner wheel 41 comprises an outer circumferential mating surface 413 which is opposite to the inner surface 411. In other words, the outer circumferential mating surface 413 and the inner surface 411 are respectively provided at two opposite sides of the inner wheel 41. When the outer massage wheel 30 is assembled on the inner wheel 41 of the inner support 40, the inner circumferential engaging surface 311 of the base layer 31 of the outer massage wheel 30 is matched and engaged with the outer circumferential mating surface 413 of the inner wheel 41, so that the base layer 31 of the outer massage wheel 30 is sleeved and wound around the inner wheel 41, and thus the outer massage wheel 30 is retained on the inner wheel 41.

Accordingly, in this embodiment, both of the inner circumferential engaging surface 311 of the base layer 31 of the outer massage wheel 30 and the outer circumferential mating surface 413 of the inner wheel 41 are smooth circumferential surfaces that are seamlessly attached to each other, so as to retain the base layer 31 of the outer massage wheel 30 on the inner wheel 41.

Alternatively, the inner circumferential engaging surface 311 of the base layer 31 of the outer massage wheel 30 and the outer circumferential mating surface 413 of the inner wheel 41 may be engaged with each other through a tongue-groove engaging manner. In other words, one of the inner circumferential engaging surface 311 of the base layer 31 of the outer massage wheel 30 and the outer circumferential mating surface 413 of the inner wheel 41 is provided with protruding tongues, while the other of the inner circumferential engaging surface 311 of the base layer 31 of the outer massage wheel 30 and the outer circumferential mating surface 413 of the inner wheel 41 is provided with engaging grooves for engaging with the corresponding protruding tongues.

Alternatively, the inner circumferential engaging surface 311 of the base layer 31 of the outer massage wheel 30 and the outer circumferential mating surface 413 of the inner wheel 41 are not smooth surfaces and may be engaged with each other by frictional contact.

Figure 17:
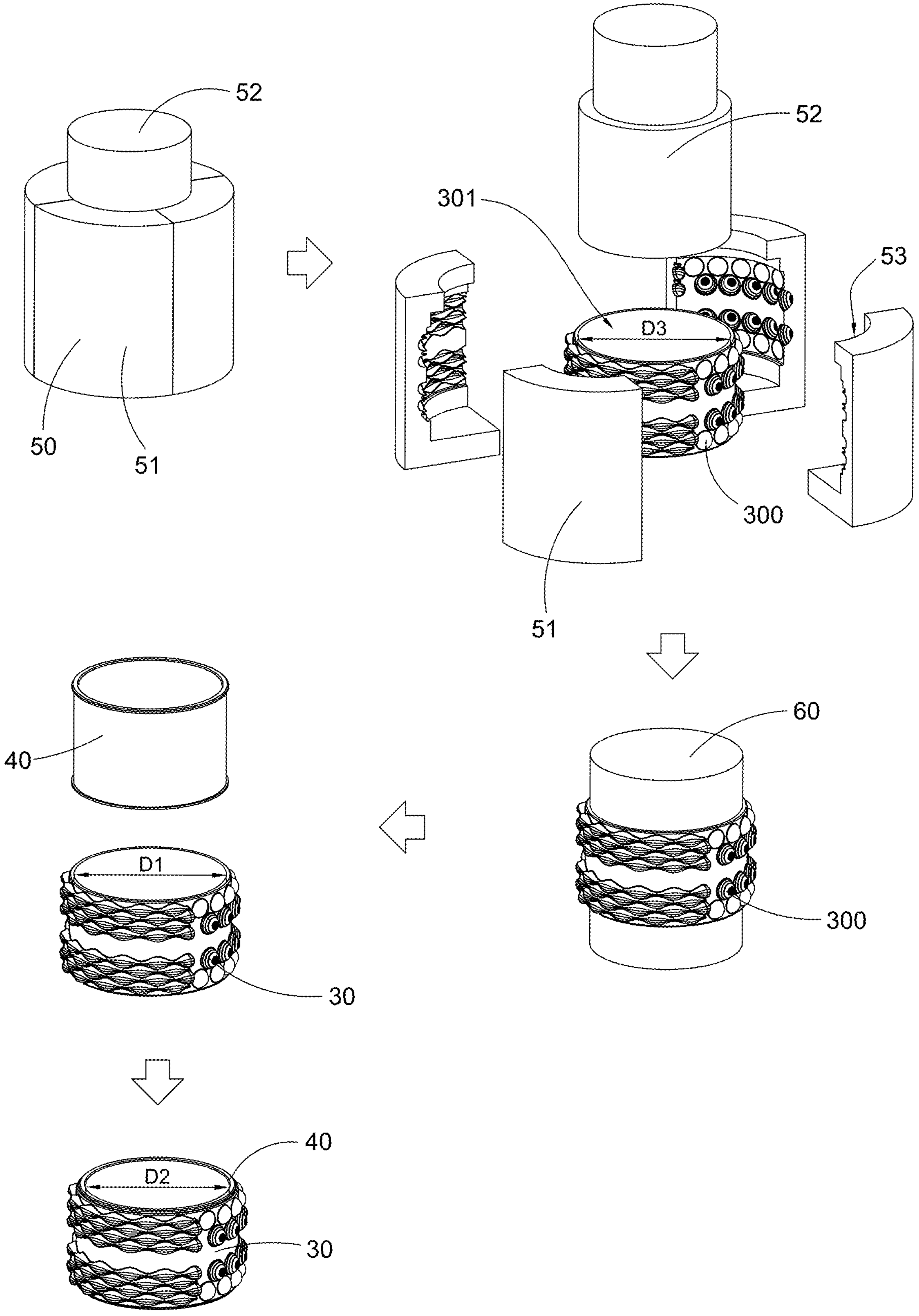
FIG. 17 is a schematic view illustrating the manufacturing method of the massage roller according to the second preferred embodiment of the present invention.
Figure 18:
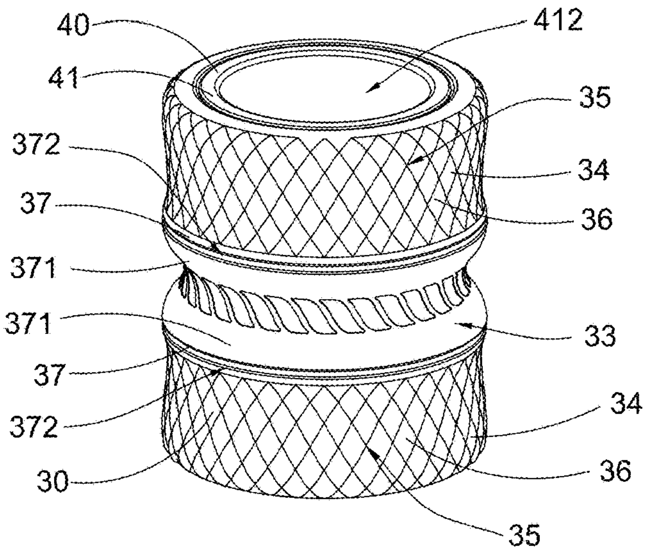
FIG. 18 is a perspective view of a massage roller according to a third preferred embodiment of the present invention.

With referring to FIG. 17 of the drawings, in this preferred embodiment, the inner circumferential engaging surface 311 of the base layer 31 of the outer massage wheel 30 has an inner diameter D1, and the outer circumferential mating surface 413 of the inner wheel 41 has an outer diameter D2, the inner diameter D1 of the inner circumferential engaging surface 311 of the base layer 31 of the outer massage wheel 30 is slightly smaller than the outer diameter D2 of the outer circumferential mating surface 413 of the inner wheel 41, so that when the base layer 31 of the outer massage wheel 30 is assembled and wound around the inner wheel 41, the base layer 31 of the outer massage wheel 30 is prevented from slipping off from the inner wheel 41.

In addition, through this engagement, there is no glue applied between the inner circumferential engaging surface 311 of the base layer 31 of the outer massage wheel 30 and the outer circumferential mating surface 413 of the inner wheel 41, and both of the inner circumferential engaging surface 311 and the outer circumferential mating surface 413 are smooth surfaces that can be seamlessly aligned with each other. Therefore, the base layer 31 of the outer massage wheel 30 is evenly and uniformly extended around the inner wheel 41 in the circumferential direction, so that the massage portion 32 can be evenly distributed along the outer surface 313 of the base layer 31.

Figure 6:
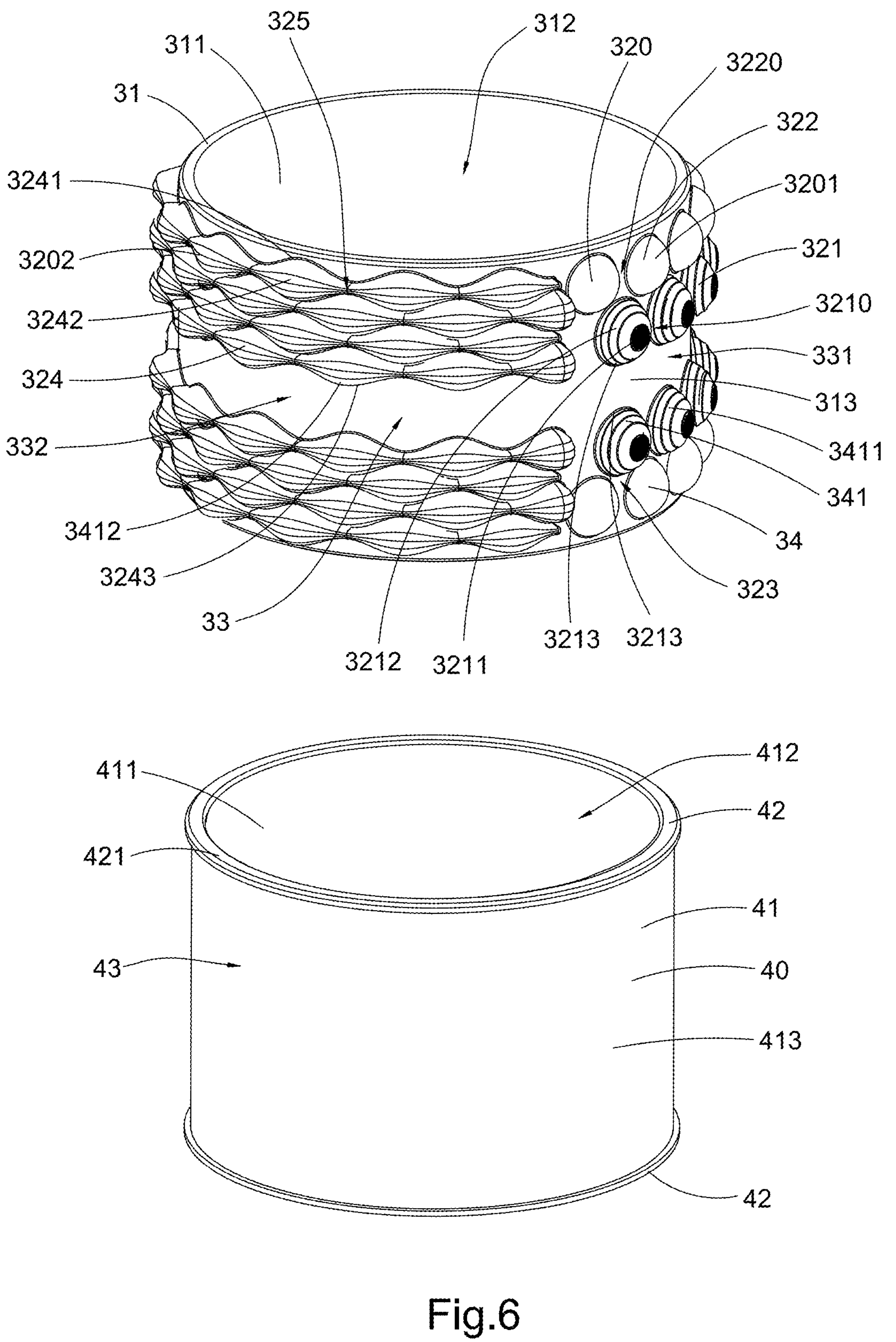
FIG. 6 is an exploded view of the massage roller according to the second preferred embodiment of the present invention.
Figure 7:
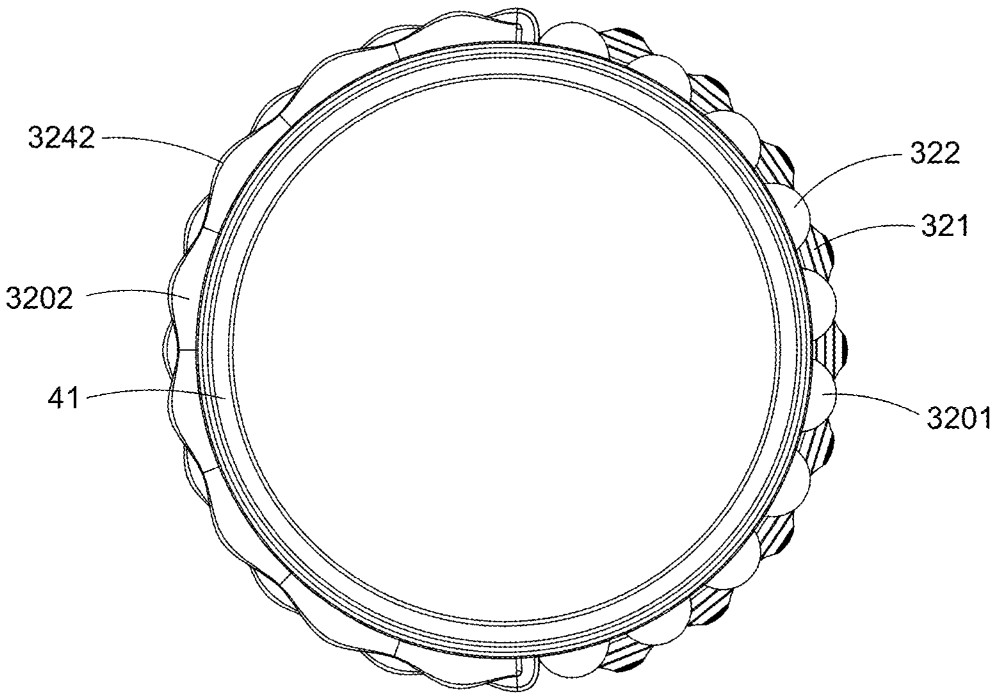
FIG. 7 is a side view of the massage roller according to the second preferred embodiment of the present invention.

As shown in FIG. 6 of the drawings, the massage portion 32 comprises a plurality of resilient protrusions 320 which are integrally protruded from the outer surface 313 of the base layer 31 for massaging the human body portion of the user. The two adjacent resilient protrusions 320 are spaced apart from each other, so as to create a deforming space allowing the deformation of the resilient protrusions 320.

Figure 4:
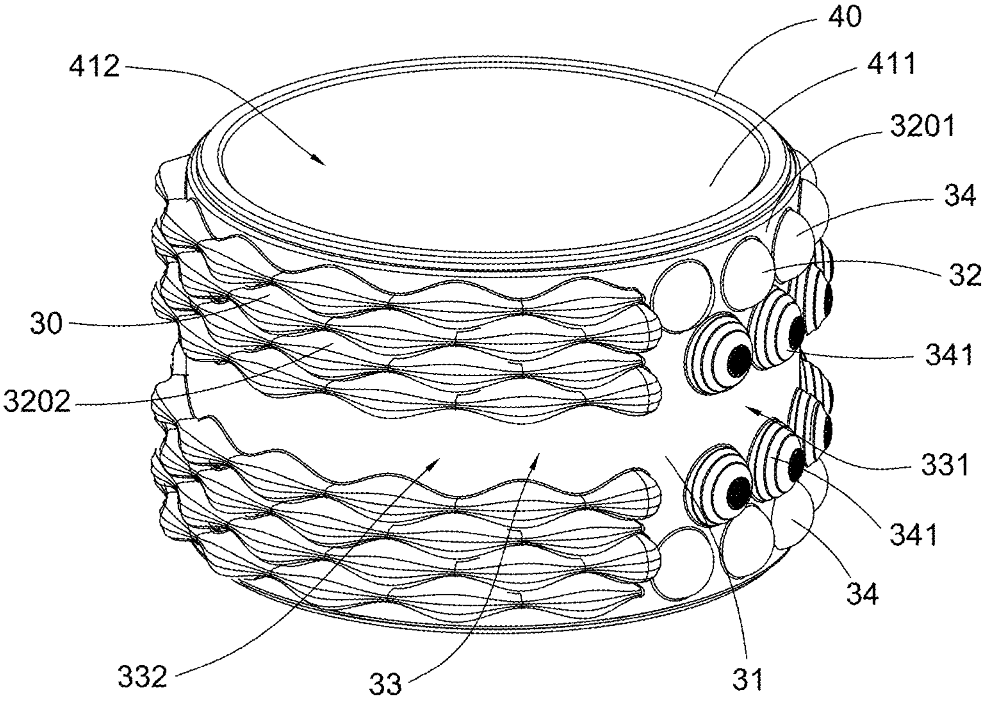
FIG. 4 is a front perspective view of a massage roller according to a second preferred embodiment of the present invention.
Figure 5:
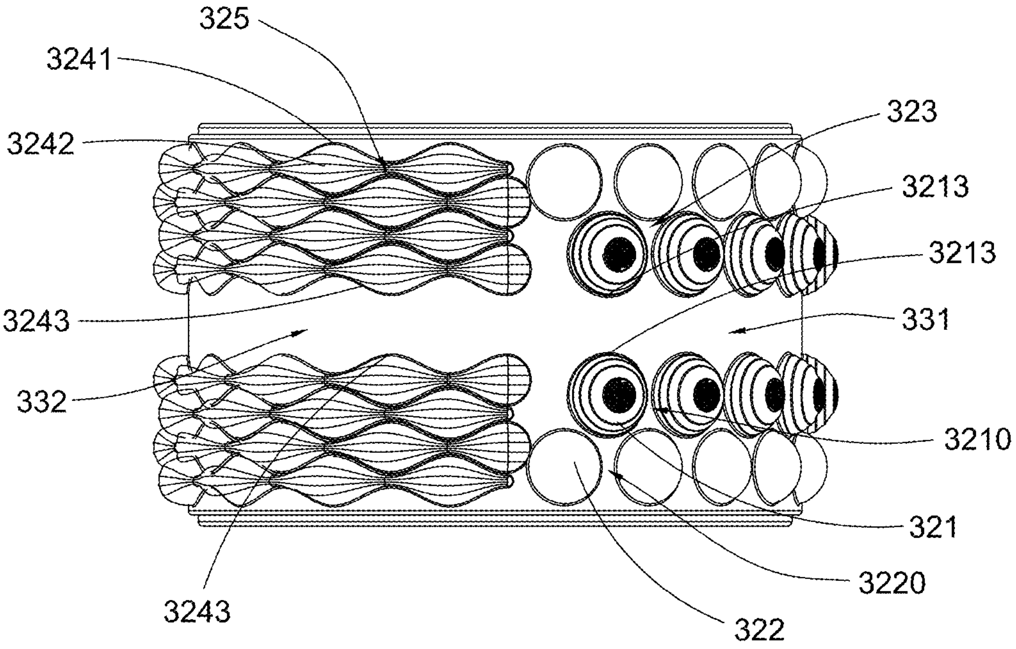
FIG. 5 is a rear perspective view of the massage roller according to the second preferred embodiment of the present invention.

In this embodiment, the massage roller can be used as a back roller for massaging the human back of the user. The outer massage wheel 30 has a spine groove 33 formed at a middle area of the massage portion 32 for protecting the spine of the user, so that the user will not feel pain during the massage when using the massage roller for exercising his or her back. According to this embodiment, the plurality of resilient protrusions 32 are formed at two opposite sides of the spine groove 33 along the circumferential direction of the outer surface 313 of the base layer 31. Actually, the spine groove 33 is formed by the resilient protrusions 32 adjacent to the spine groove 33 in this preferred embodiment. As shown in FIGS. 4 to 6 of the drawings, the spine groove 33 actually can be formed between two rows of the resilient protrusions 320.

The plurality of resilient protrusions 32 can be formed into rows to form multiple bumps for massaging the muscles of the back of the user. Alternatively, each row of the resilient protrusions 32 also can be formed as an integral protrusion stripe.

Referring to FIGS. 4 to 6 of the drawings, the plurality of resilient protrusions 320 comprises one or more rows of first resilient protrusions 321 and one or more rows of second resilient protrusions 322 distributed on the outer surface 313 of the base layer 31. As shown in the drawings, the surfaces of two rows of the first resilient protrusions 321 facing towards each other actually define the spine groove 33, and the two rows of the first resilient protrusions 321 are thus formed at the two opposite sides of the spine groove 33.

In this embodiment, two rows of the second resilient protrusions 322 are respectively formed at the outer side of the two rows of the first resilient protrusions 321, so that there are two rows of the resilient protrusions 320 at each side of the two opposite sides of the spine groove 33 for massaging the back of the user.

Preferably, the first resilient protrusions 321 are evenly distributed along the outer surface 313 of the base layer along the circumferential direction, a first gap 3210 is form between each two adjacent first resilient protrusions 321 to allow the deformation of the first resilient protrusions 321.

As shown in FIG. 6, each of the first resilient protrusions 321 comprises a top central massage area 3211 and a plurality of step areas 3212 integrally extended from the top central massage area 3211, the step areas 3212 are integrally stacked with each other and configured to have gradually increasing diameters from top to bottom, so as to enhance the elastic strength of each first resilient protrusion 321. Each top central massage area 3211 is configured to have a circular shape that is arranged to form a massage point for massaging the back of the user.

The second resilient protrusions 322 are evenly distributed along the outer surface 313 of the base layer along the circumferential direction, a second gap 3220 is form between each two adjacent second resilient protrusions 322 to allow the deformation of the second resilient protrusions 322. As shown in the drawings, each second resilient protrusions 322 can be embodied as a round bump.

In this embodiment, the rows of the first resilient protrusions 321 are parallel to the rows of the second resilient protrusions 322, a spacing 323 is formed between a row of the first resilient protrusions 321 and a row of the second resilient protrusions 322. The two rows of the first resilient protrusions 321 are provided at an inner side of the two rows of the second resilient protrusions 322.

The positions of the first resilient protrusions 321 in the row of the first resilient protrusions 321 can be aligned with the positions of the second resilient protrusions 322 in the row of the second resilient protrusions 322. In this embodiment, the first resilient protrusions 321 and the second resilient protrusions 322 adjacent to the first resilient protrusions 321 are configured in an staggered arrangement.

It is worth mentioning that the configuration of the shapes and positions of the first resilient protrusions 321 and the second resilient protrusions 322 are not limited in the present invention.

Figure 8:
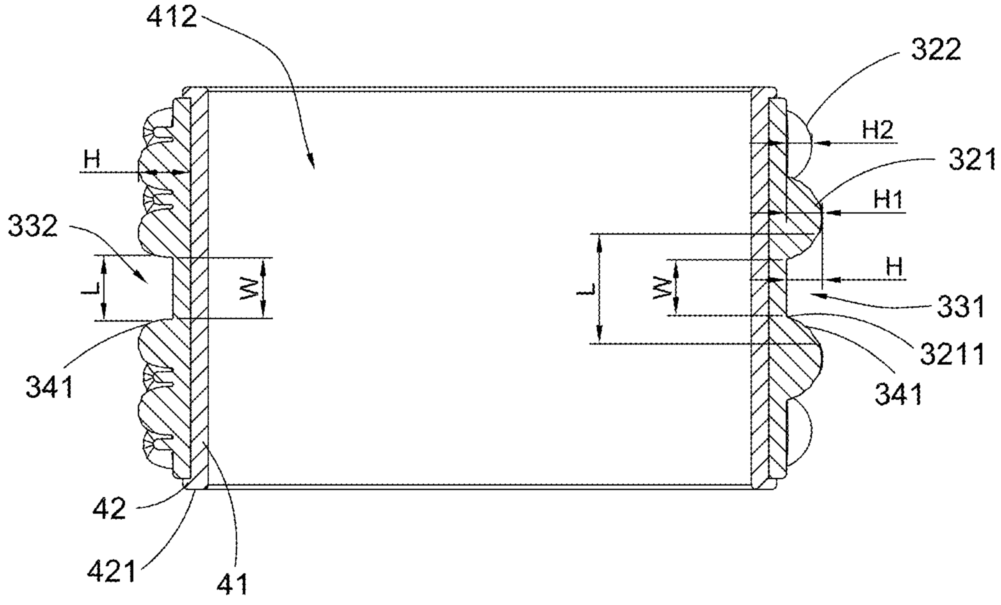
FIG. 8 is a cross-sectional view of the massage roller according to the second preferred embodiment of the present invention.
Figure 9:
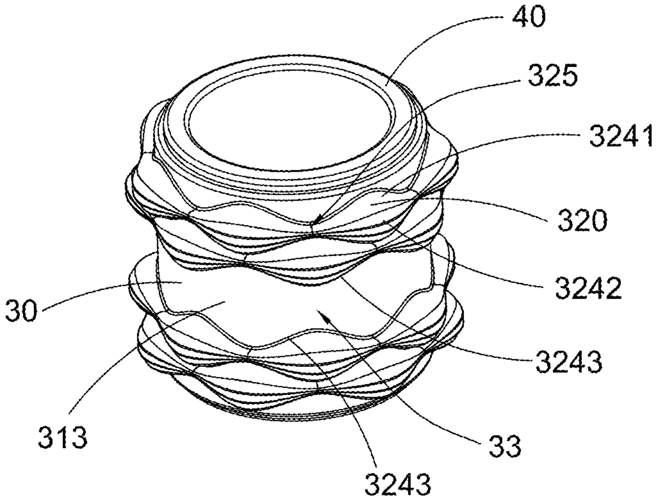
FIG. 9 is a perspective view of a massage roller according to a first alternative mode of the second preferred embodiment of the present invention.
Figure 10:
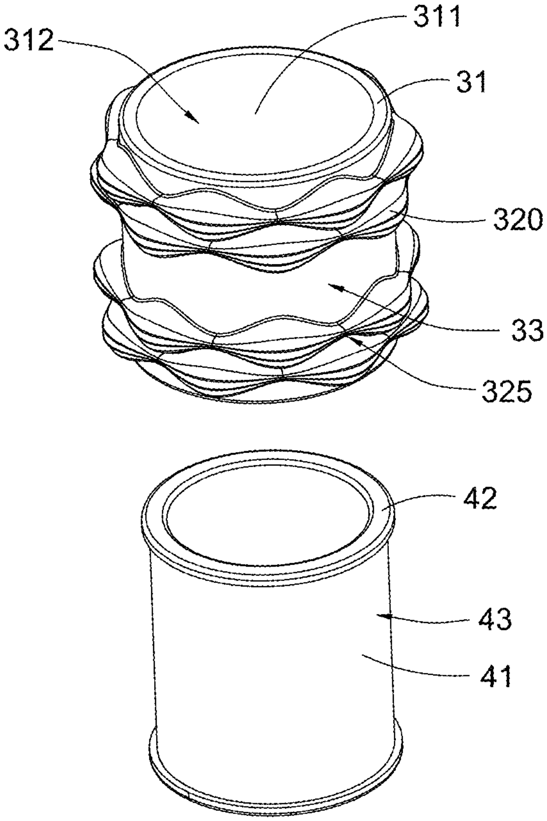
FIG. 10 is an exploded view of the massage roller according to the first alternative mode of the second preferred embodiment of the present invention.
Figure 11:
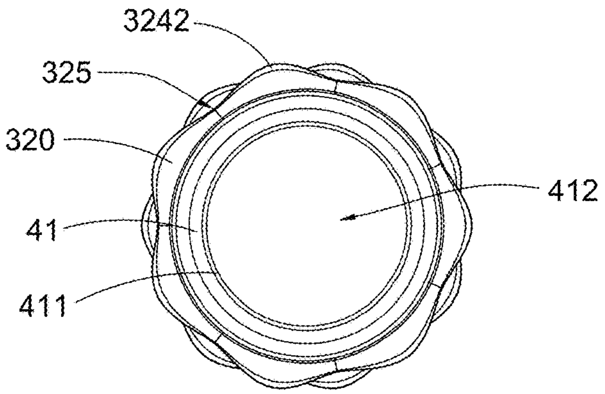
FIG. 11 is a side view of the massage roller according to the first alternative mode of the second preferred embodiment of the present invention.
Figure 12:
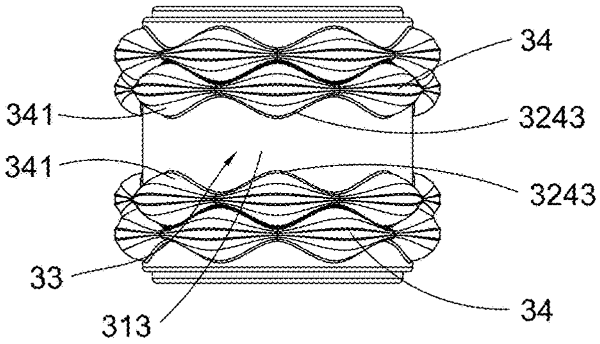
FIG. 12 is a front perspective view of the massage roller according to the first alternative mode of the second preferred embodiment of the present invention.
Figure 13:
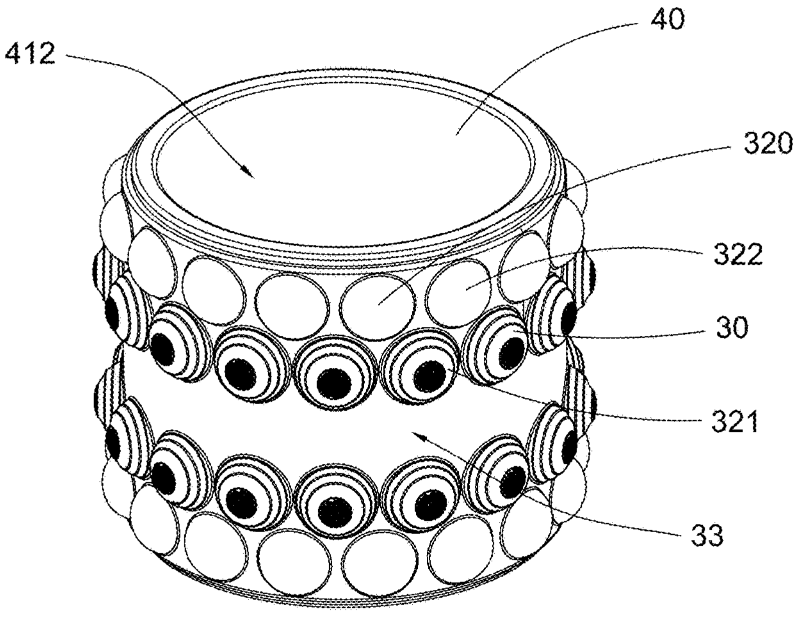
FIG. 13 is a perspective view of a massage roller according to a second alternative mode of the second preferred embodiment of the present invention.
Figure 14:
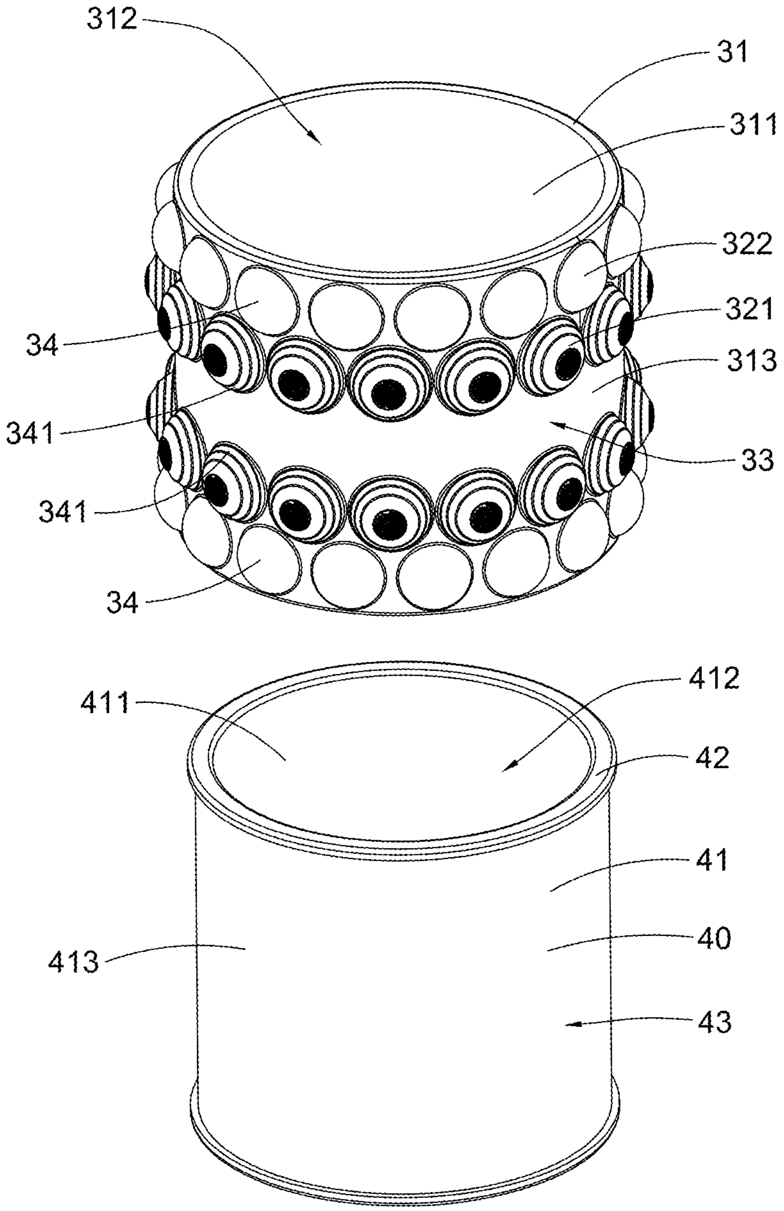
FIG. 14 is an exploded view of the massage roller according to the second alternative mode of the second preferred embodiment of the present invention.
Figure 15:
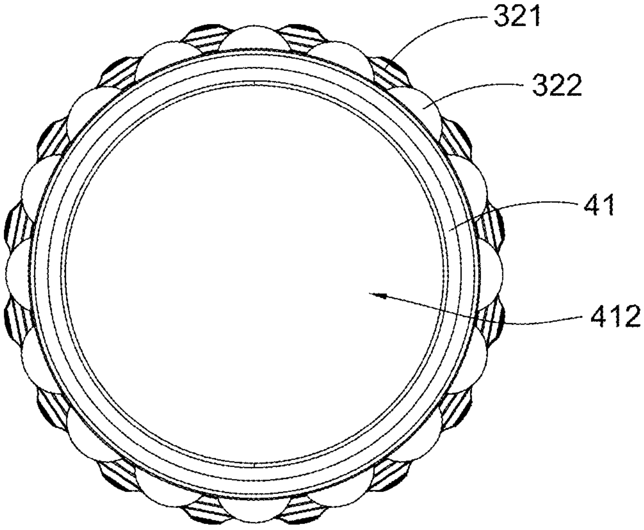
FIG. 15 is a side view of the massage roller according to the second alternative mode of the second preferred embodiment of the present invention.
Figure 16:
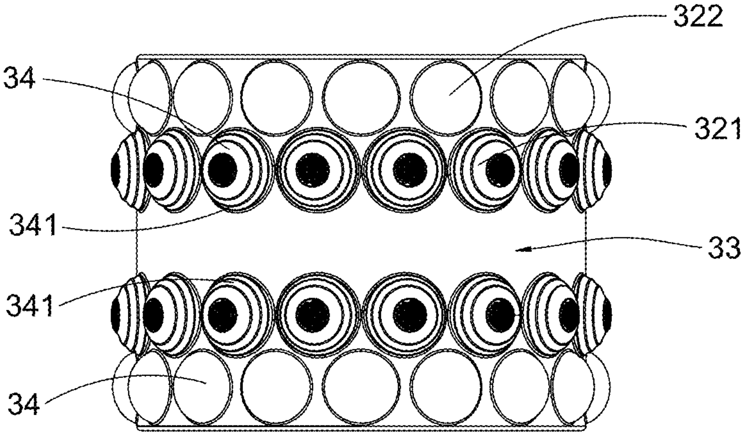
FIG. 16 is a front perspective view of the massage roller according to the second alternative mode of the second preferred embodiment of the present invention.

Preferably, as shown in FIG. 8, each row of the first resilient protrusions 321 adjacent to the spine groove 33 has a first height defining a first massaging depth H1, each row of the second resilient protrusions 322 away from the spine groove 33 has a second height defining a second massage depth H2, the first height is larger than the second height, so that the first massaging depth H1 is larger than the second massage depth H2. The rows of the first resilient protrusions 321 adjacent to the spine groove 33 are provided at a position corresponding to the erector spinae muscles of the back of the user, so as to enhance the massage effect to the erector spinae muscles. In other words, the erector spinae muscles will be applied with deeper massage effect than other areas of the back of the user, and the stretching effect to the spine is thus also enhanced. The rows of the second resilient protrusions 322 having the smaller massage depth H2 will be used to massage the psoas major muscles.

As shown in FIG. 6 of the drawings, the plurality of the resilient protrusions 320 further comprises a plurality of third resilient protrusions 324. Accordingly, the massage portion 32 comprises two massage areas which are a first massage area 3201 and a second massage area 3202, the first massage area 3201 is formed with the first resilient protrusions 321 and the second resilient protrusions 322, the second massage area 3202 is formed with the third resilient protrusions 324. Accordingly, the first massage area 3201 and the second massage area 3202 can be provided with the resilient protrusions 320 of different materials, different shapes, different heights, etc., so that the two massage areas can provide different massage effects to the user, and thus the user can choose his or her desired massage area for exercising his or her back. In addition, the first massage area 3201 and the second massage area 3202 are provided at different circumferential sections of the massage portions 32 along the circumferential direction of the outer massage wheel 30.

According to this embodiment, the plurality of third resilient protrusions 324 form two areas, each area of the third resilient protrusions 324 is formed as an integral piece with indented grooves 325 for distinguishing the adjacent third resilient protrusions 324 from each other, and the indented grooves 325 also provide the deformation space for the adjacent third resilient protrusions 324. As shown in FIG. 6 of the drawings, each area of the third resilient protrusions 324 can be embodied to comprise four rows of the third resilient protrusions 324 which are integrated to from Each third resilient protrusion 324 has a configuration different from the first resilient protrusions 321 and the second resilient protrusions. More specifically, each third resilient protrusion 324 comprises a plurality of resilient strips 3241 each comprising a central arch portion 3242, the plurality of resilient strips 3241 are integral sections extended along the circumferential directions, and the central arch portions 3242 of the plurality of resilient strips 3241 are integrated to form a central protuberance of the corresponding third resilient protrusion 324 for functioning as a bump to massage the back of the user.

The spine groove 33 comprises a first groove section 331 which is formed at the first massage area 3201, and a second groove section 332 which is formed at the second massage area 3202. Accordingly, the first groove section 331 is formed between two rows of first resilient protrusions 321, the second groove section 332 is formed between the two areas of the third resilient protrusions 324. When the first massage area 3201 with the first resilient protrusions 321 and the second resilient protrusions 322 is used for massaging the back of the user, the first groove section 331 is used for protecting the spine of the user. When the second massage area 3202 with the third resilient protrusions 324 is used for massaging the back of the user, the second groove section 332 is used for protecting the spine of the user.

Preferably, the spine groove 33 has a width W which is ranged from 15-35 mm, the range of width W of the spine groove 33 is suitable for human bodies of different users. In other words, when the width W of the spine groove 33 is smaller than 15 mm, the spacing room will be so small that the groove is not apparent enough to be distinguished from a gap between the adjacent resilient protrusions 320. When the width W of the spine groove 22 is larger than 35 mm, the resilient protrusions 320 will not act on the erector spinae muscles.

In this illustrated embodiment, each of the first resilient protrusion 321 comprise an inner edge 3213 which is joined with the outer surface 313 of the base layer 31, the distance between the inner edges 3213 of the two rows of the first resilient protrusions 321 which are two groove-forming rows of resilient protrusions is defined as the width W of the first groove section 331 of the spine groove 33. Each area of the third resilient protrusions 324 comprise an inner edge 3243 which is joined with the outer surface 313 of the base layer 31, the distance between the inner edges 3243 of the two areas of the third resilient protrusions 324 is defined as the width W of the second groove section 332 of the spine groove 33.

A height H of the spine groove 33, which is corresponding to a height of each resilient protrusion 320, is ranged from 8-25 mm, so that a suitable pressure can be applied to the back of the user by the resilient protrusions 320. In other words, when the height of each resilient protrusion 320 is smaller than 8 mm, the pressure will be too weak, when the height of each resilient protrusion 320 is larger than 25 mm, the back of user will be exerted with an excessive pressure that the user may not be able to withstand.

Referring to FIG. 6 and FIG. 8 of the drawings, the inner support 40 further comprises two retaining steps 42 which are integrally from two opposite circumferential edges of the inner wheel 41 to define an accommodating space 43 between the two circumferential retaining steps 42 for retaining the base layer 31 of the outer massage wheel 30, so as to prevent the outer massage wheel 30 to slip off from the inner wheel 41. In addition, a thickness of the retaining steps 42 is smaller than a thickness of the base layer 31, so that an upper surface 421 of each retaining step 42 will not be protruded from the base layer 31, so that the rigid upper surface 421 of each retaining step 42 is not prone to have contact with the human body.

According to the present invention, the massage portion 32 comprises two circumferential massage regions 34 each comprising a guiding surface 341, the spine groove 33 is formed between the two guiding surfaces 341 of the two circumferential massage regions 34. In this embodiment, as shown in the drawings, each circumferential massage regions 34 comprises a row of the first resilient protrusions 321 and a row of the second resilient protrusions 322 in the first massage area 3201 and four rows of the third resilient protrusions 324 in the second massage area 3202.

The guiding surface 341 comprises an inner stepped surface 3411 of each first resilient protrusion 321 and an inner arc-shaped surface 3412 of each inner third resilient protrusion 324. Accordingly, the distance between the inner stepped surfaces 3411 of two rows of the first resilient protrusion 321 is gradually reducing from top to bottom, the distance between the inner arc-shaped surfaces 3412 of the inner third resilient protrusions 324 is gradually reducing from top to bottom, so that a distance L between the two guiding surfaces 341 is reducing from top to bottom, so as to facilitate the massage roller to guide the spine of the user to enter the spine groove 33 during usage of the massage roller by the user.

Alternatively, the person of ordinary skilled in the art should understand that the guiding surface 341 can be embodied as an inclined surface, or a curved surface.

Referring to FIGS. 9 to 16 of the drawings, according to two alternative modes of the second preferred embodiment, the massage roller comprises the outer massage wheel 30 and the inner support 40 which comprises the inner wheel 41 for assembling the outer massage wheel 30. In these embodiments, the outer massage wheel 30 comprises the base layer 31 and the massage portion 32 which is integrally protruded from the base layer 31. The massage portion 32 comprises two areas of the resilient protrusions 320 which are spaced apart from each other to form the spine groove 33.

Each area of the resilient protrusions 320 is extended along the entire circumferential outer surface 313 of the base layer 31 to provide a same massaging effect. Each area of the resilient protrusions 320 can be provided with the above first resilient protrusions 321, the second resilient protrusions 322 or the third resilient protrusions 324. In the illustrated embodiment shown in FIGS. 9 to 12, each area of the resilient protrusions 320 is provided with the above third resilient protrusions 324 each comprising a plurality of resilient strips 3241. In the illustrated embodiment shown in FIGS. 13 to 16, each area of the resilient protrusions 320 is provided with the above first resilient protrusions 321 and the second resilient protrusions 322.

Referring to FIG. 17 of the drawings, a manufacturing method of the massage roller of the present invention is illustrated. The method comprises a step of preparing the inner support 40, a step of preparing the outer massage wheel 30 and a step of assembling the outer massage wheel 30 on the inner support 40.

In the step of preparing the inner support 40, the inner wheel 41 and the retaining steps can be manufactured through a molding process. Accordingly, a material of the inner support 40 in a fluid state is injected in a mould, and then the fluid material is solidified to form the rigid inner support 40.

In the step of preparing the outer massage wheel 30, as shown in FIG. of the drawings, the outer massage wheel 30 is manufactured by a foaming process. More specifically, a foaming material of the outer massage wheel 30 is in a fluid state and is injected into a foaming mould 50 which comprises a shaping chamber body 51 and an inner core rod 52, the foaming material in the foaming mould 50 is heated to undergo a foaming process, so as to form a foamed wheel 300 corresponding to a position of a shaping channel 53 between the shaping chamber body 51 and the inner core rod 52, and an inner cavity 301 of the foamed wheel 300 is formed corresponding to a position of the inner core rod 52 which has a circular cross section.

The foamed wheel 300 is then shrunk to form the outer massage wheel 30. Accordingly, the foamed wheel 300 has an inner diameter D3 that is larger than the inner diameter D1 of the outer massage wheel 30. During the shrinking process, the inner diameter D3 of the foamed wheel 300 is gradually reducing until the inner diameter D3 of the foamed wheel 300 is equal to the inner diameter D1 of the outer massage wheel 30 which is slightly smaller than the outer diameter D2 of the inner wheel 41.

When the foamed wheel 300 is taken out of the shaping mould 50, the foamed wheel 300 can be put into a heating oven, so that the foamed wheel 300 is further heated to discharge the air bubbles in the foamed wheel 300, so that the inner diameter D3 of the foamed wheel 300 is reduced.

In addition, a shaping column 60 is further provided in the shrinking process, the shaping column 60 has a diameter that is equal to the inner diameter D1 of the outer massage wheel 30, so that when the foamed wheel 300 is wound around the shaping column 60 during the shrinking process, the inner diameter D3 of the foamed wheel 300 will be reduced to the diameter of the shaping column 60 which is equal to the inner diameter D1 of the outer massage wheel 30, and thus the outer massage wheel 30 is finally formed.

In the step of assembling the outer massage wheel 30 on the inner support 40, the outer massage wheel 30 having a smaller inner diameter D1 is wound around the inner wheel 41 having a larger outer diameter D2, so that no glue or adhesive is required to be applied between the smooth assembling surfaces of the outer massage wheel 30 and the inner wheel 41 of the inner support 40.

Referring to FIGS. 18 to 22 of the drawings, a massage roller according to a third preferred embodiment of the present invention is illustrated. In this embodiment, the massage roller comprises an outer massage wheel 30 and an inner support 40, the outer massage wheel 30 is wound around the inner support 40 for providing a massage effect to a user.

More specifically, the outer massage wheel 30 comprises a base layer 31 for mounting with the inner support 40 and a massage layer 32 integrally formed on the base layer 31 for massaging the human body portion such as a human back or a leg of the user. The massage layer 32 comprises two circumferential massage regions 34 defining a spine groove 33 therebetween for protecting the spine of the user.

In this embodiment, each circumferential massage region 34 has a plurality of staggered grooves 35 to form a plurality of resilient protruding areas 36 which are distinguishable from each other for massaging the muscles of the user, and comprises a circumferential protrusion 37 adjacent to the spine groove 33. The resilient protruding areas 36 are provided at an outer side of the circumferential protrusion 37.

It is worth mentioning that the shape and size of each resilient protruding area 36 is not limited, such as a diamond shape, a square shape, a round shape, a triangle shape and a rectangular shape.

In this embodiment, the base layer 31 is form in a ring shape and comprises an inner circumferential engaging surface 311 defining an inner circular receiving chamber 312 for receiving the inner support 40. The inner support 40 comprises an inner wheel 41 for mounting the base layer 31 of the outer massage wheel 30, so as to retain the outer massage wheel 30 on the inner support 40. More specifically, the inner wheel 41 is a ring-shaped wheel that is fitted into the inner circular receiving chamber 312 of the base layer 31 of the outer massage wheel 30, so that the inner wheel 41 functions as an inner core of the massage roller.

Accordingly, the inner wheel 41 comprises an inner surface 411 defines an inner chamber 412, so that the material for the inner support 40 is reduced, and it is also convenient for the user to carry the massage roller by allowing an arm of the user to penetrate through the inner chamber 411 of the inner wheel 41.

According to this embodiment, the inner wheel 41 comprises an outer circumferential mating surface 413 which is opposite to the inner surface 411. In other words, the outer circumferential mating surface 413 and the inner surface 411 are respectively provided at two opposite sides of the inner wheel 41. When the outer massage wheel 30 is assembled on the inner wheel 41 of the inner support 40, the inner circumferential engaging surface 311 of the base layer 31 of the outer massage wheel 30 is matched and engaged with the outer circumferential mating surface 413 of the inner wheel 41, so that the base layer 31 of the outer massage wheel 30 is sleeved on the inner wheel 41, and thus the outer massage wheel 30 is retained on the inner wheel 41.

Accordingly, in this embodiment, both of the inner circumferential engaging surface 311 of the base layer 31 of the outer massage wheel 30 and the outer circumferential mating surface 413 of the inner wheel 41 are smooth circumferential surfaces that are seamlessly attached to each other, so as to retain the base layer 31 of the outer massage wheel 30 on the inner wheel 41.

Similarly, in this preferred embodiment, the inner circumferential engaging surface 311 of the base layer 31 of the outer massage wheel 30 has an inner diameter D1, and the outer circumferential mating surface 413 of the inner wheel 41 has an outer diameter D2, the inner diameter D1 of the inner circumferential engaging surface 311 of the base layer 31 of the outer massage wheel 30 is slightly smaller than the outer diameter D2 of the outer circumferential mating surface 413 of the inner wheel 41, so that when the base layer 31 of the outer massage wheel 30 is assembled and wound around the inner wheel 41, the base layer 31 of the outer massage wheel 30 is prevented from slipping off from the inner wheel 41.

Preferably, the spine groove 33 of this embodiment is not formed by the resilient protrusions which are protruded from the base layer 31, but is an indented groove which is indented into the base layer 31. The spine groove 33 formed between the two circumferential protrusions 37 has a width W which is ranged from 15-35 mm, the range of width W of the spine groove 33 is suitable for human bodies of different users.

A height H of the spine groove 33 is ranged from 8-25 mm, so that a suitable pressure can be applied to the back of the user by the circumferential protrusions 37 each can be an integral protrusion along a circumference of the base layer 31, or may comprises a plurality of protrusion parts along the circumference of the base layer 31.

Figure 21:
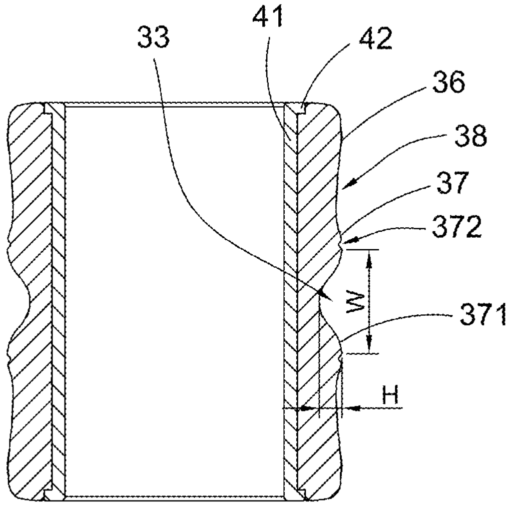
FIG. 21 is a cross-sectional view of the massage roller according to the third preferred embodiment of the present invention.

In this embodiment, each circumferential protrusion 37 forms a guiding surface 371 which is an arc-shaped surface, so that the distance between the two guiding surfaces 371 is gradually reducing from top to bottom, so that the spine of the user easy to be guided into the spine groove 33. A distance between the two circumferential protrusions 37 define the width W of the spine groove 33 which is ranged from 15-35 mm, as shown in FIG. 21 of the drawings.

The spine groove 33 has a top opening 333 for allowing the spine of the user to enter the spine groove 33. The bottom wall of the spine groove 33 is formed with a plurality of bottom indented grooves 334, so that an aesthetic pattern can be formed at the bottom wall of the spine groove 33.

According to this embodiment, each circumferential protrusion 37 is formed at a position which is corresponding to the erector spinae muscles of the user, and has a height that is larger than the resilient protruding areas 36, so that each circumferential protrusion 37 provides a first massaging depth H1 that is larger than a second massaging depth H2 of the resilient protruding areas 36. Therefore, the circumferential protrusions 37 adjacent to the spine groove 33 have a larger massage depth than other areas of the massage surface of the outer massage wheel 30, so as to enhance the spine stretching effect and enhance the massage effect to the erector spinae muscles.

Figure 22:
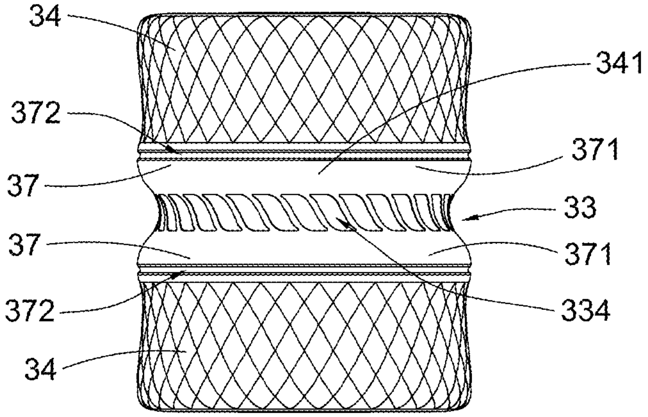
FIG. 22 is a front perspective view of the massage roller according to the third preferred embodiment of the present invention.
Figure 23:
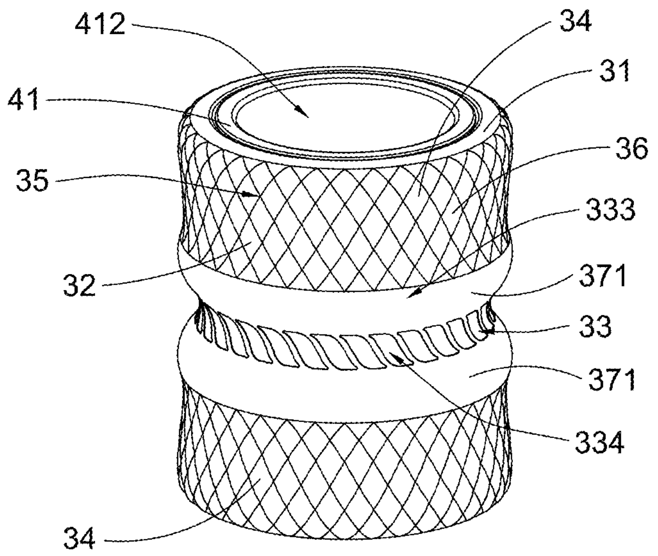
FIG. 23 is a perspective view of a massage roller according to an alternative mode of the third preferred embodiment of the present invention.

As shown in FIG. 22 of the drawings, each circumferential protrusion 37 may have a circumferential slit 372 formed at a middle thereof for allowing the deformation of the corresponding circumferential protrusion 37. Alternatively, as shown in FIG. 23 of the drawings, each circumferential protrusion 37 is not formed with the circumferential slit 372.

As shown in FIG. 21 of the drawings, from an outer edge of the outer massage wheel 30 to the circumferential protrusion 37, the resilient protruding areas 36 have gradually reducing height, so as to form a concave groove 38 which is aligned with the psoas major muscles, so that the resilient protruding areas 36 corresponding to the concave groove 38 is suitable for massaging the psoas major muscles of the user.

It is worth mentioning that the resilient protruding areas 36 of this embodiment can be constructed to have smaller height, so that the massage roller of this embodiment can be suitable for an exercise starter person, so that the user will not feel great pain when using the massage roller with the resilient protruding areas 36.

Figure 19:
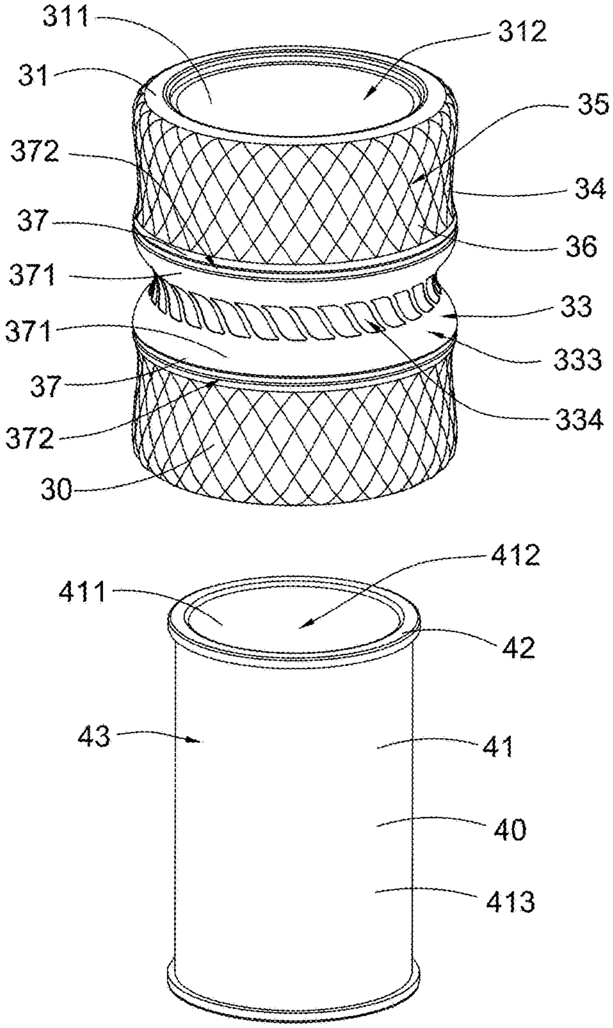
FIG. 19 is an exploded view of the massage roller according to the third preferred embodiment of the present invention.
Figure 20:
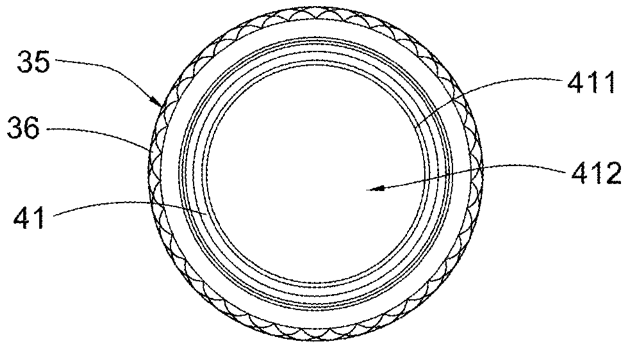
FIG. 20 is a side view of the massage roller according to the third preferred embodiment of the present invention.

Referring to FIG. 19 of the drawings, the inner support 40 further comprises two retaining steps 42 which are integrally from two opposite circumferential edges of the inner wheel 41 to define an accommodating space 43 between the two circumferential retaining steps 42 for retaining the base layer 31 of the outer massage wheel 30, so as to prevent the outer massage wheel 30 to slip off from the inner wheel 41. In addition, a thickness of the retaining steps 42 is smaller than a thickness of the base layer 31.

The manufacturing method of the massage roller of this third preferred embodiment of the present invention is similar to the above second preferred embodiment. Corresponding, the method comprises a step of preparing the inner support 40 by injection molding, a step of preparing the outer massage wheel 30 and a step of assembling the outer massage wheel 30 on the inner support 40.

In the step of preparing the outer massage wheel 30, the outer massage wheel 30 is manufactured by a foaming process. More specifically, a foaming material of the outer massage wheel 30 is in a fluid state and is injected into the foaming mould 50, so that the foaming material in the foaming mould 50 is heated to undergo a foaming process, so as to form a foamed wheel 300 corresponding to a position of a shaping channel 53 between the shaping chamber body 51 and the inner core rod 52, and an inner cavity 301 of the foamed wheel 300 is formed corresponding to a position of the inner core rod 52 which has a circular cross section. The foamed wheel 300 is then shrunk to form the outer massage wheel 30. Comparing with the above second preferred embodiment, the shaping chamber body 51 comprises protrusions and grooves that have different configurations, so as to form the spine groove 33, the staggered grooves 35, the resilient protruding areas 36 and the circumferential protrusions 37.

Figure 24:
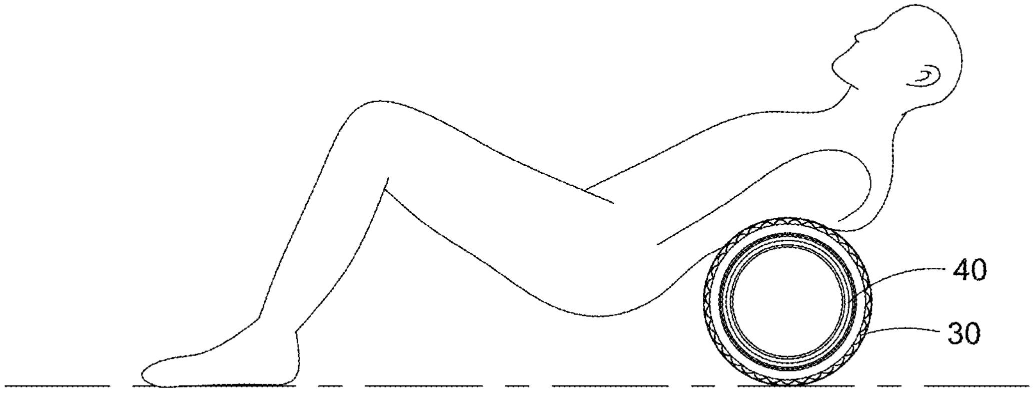
FIG. 24 is a perspective view illustrating the massage roller being used as a back roller according to the preferred embodiments of the present invention.

Referring to FIG. 24 of the drawings, the massage roller can be embodied as a back roller that is placed under the back of the user, the rotation and rolling of the back roller will achieve the massage to the muscles of the back of the user.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A massage roller, comprising:

an outer massage wheel; and an inner support, wherein said outer massage wheel is sleeved on said inner support;

wherein said outer massage wheel comprises a base layer and a massage portion integrally protruded from said base layer, wherein said massage portion comprises two circumferential massage regions and defines two resilient protruding areas on said two circumferential massage regions respectively, wherein said outer massage wheel further comprises a spine groove indented on said massage portion, wherein said spine groove is defined between said two circumferential massage regions;

wherein said outer massage wheel further comprises an inner circumferential engaging surface, said inner support comprises an outer circumferential mating surface, wherein said inner circumferential engaging surface is attached and engaged with said outer circumferential mating surface of said inner support without a glue applied between said inner circumferential engaging surface of said outer massage wheel and said outer circumferential mating surface of said inner support, wherein said inner support comprises an inner wheel and two retaining steps which are integrally extended from two opposite circumferential edges of said inner wheel to define an accommodating space between said two retaining steps for retaining said base layer of said outer massage wheel, wherein said inner circumferential engaging surface of said outer massage wheel has an inner diameter which is smaller than an outer diameter of said outer circumferential mating surface of said inner support;

wherein said outer massage wheel is made of a foaming material which is capable of being heated to foam and being further heated to shrink to form said outer massage wheel;

wherein said outer massage wheel further a plurality of bottom indented grooves indented on a bottom wall of said spine groove;

wherein said outer massage wheel further has two circumferential protrusions protruded from said base layer, wherein said spine groove is formed between said two circumferential protrusions, wherein each of said circumferential protrusions is formed between one of said circumferential massage regions and the spine groove, wherein a height of each of said circumferential protrusions is larger than a height of each of said resilient protruding areas, such that a peak of said circumferential protrusion is the highest point of said outer massage wheel;

wherein said height of each of said resilient protruding areas is gradually reduced at a mid-portion thereof to form a concave groove on each of said circumferential massage regions, such that one side of said concave groove is extended to an outer edge of said outer massage wheel and an opposed side of said concave groove is extended to said circumferential protrusion;

wherein each of said circumferential protrusions forms a guiding surface extended toward said spine groove, wherein said bottom indented grooves are positioned between said guiding surfaces of said circumferential protrusions, wherein said guiding surface of each of said circumferential protrusions is an arc-shaped surface, such that a distance between said guiding surface of said circumferential protrusions is gradually reducing from top to bottom.

2. The massage roller, as recited in claim 1, wherein said circumferential protrusion has a circumferential slit formed at a middle thereof for allowing deformation of said circumferential protrusion, wherein a thickness of each of said retaining steps is smaller than a thickness of the base layer, wherein said resilient protruding area and said circumferential protrusion are separated by said circumferential slit.

3. A massage roller, comprising:

an outer massage wheel; and an inner support, wherein said outer massage wheel is sleeved on said inner support;

wherein said outer massage wheel comprises a base layer and a massage portion integrally protruded from said base layer, wherein said massage portion comprises two circumferential massage regions and defines two resilient protruding areas on said two circumferential massage regions respectively, wherein said outer massage wheel further comprises a spine groove indented on said massage portion, wherein said spine groove is defined between said two circumferential massage regions;

wherein said outer massage wheel further has two circumferential protrusions protruded from said base layer, wherein said spine groove is formed between said two circumferential protrusions, wherein each of said circumferential protrusions is formed between one of said circumferential massage regions and the spine groove, wherein a height of each of said circumferential protrusions is larger than a height of each of said resilient protruding areas, such that a peak of said circumferential protrusion is the highest point of said outer massage wheel;

wherein said height of each of said resilient protruding areas is gradually reduced at a mid-portion thereof to form a concave groove on each of said circumferential massage regions, such that one side of said concave groove is extended to an outer edge of said outer massage wheel and an opposed side of said concave groove is extended to said circumferential protrusion.

* * * * *